(12) United States Patent
Osman et al.

(10) Patent No.: US 8,477,857 B2
(45) Date of Patent: Jul. 2, 2013

(54) EFFICIENT CARTESIAN TRANSMITTER USING SIGNAL COMBINER

(75) Inventors: Saleh Osman, Cupertino, CA (US); Gregoire Le Grand de Mercey, San Francisco, CA (US)

(73) Assignee: Panasonic Corporation, Osaka (JP)

( * ) Notice: Subject to any disclaimer, the term of this patent is extended or adjusted under 35 U.S.C. 154(b) by 191 days.

(21) Appl. No.: 13/103,687

(22) Filed: May 9, 2011

(65) Prior Publication Data

US 2012/0288018 A1 Nov. 15, 2012

(51) Int. Cl.
*H04L 27/00* (2006.01)

(52) U.S. Cl.
USPC .......................................... 375/259; 375/295

(58) Field of Classification Search
None
See application file for complete search history.

(56) References Cited

U.S. PATENT DOCUMENTS

| | | | |
|---|---|---|---|
| 5,719,576 A * | 2/1998 | Draxelmayr | 341/150 |
| 6,061,010 A | 5/2000 | Adams et al. | |
| 6,369,651 B1 * | 4/2002 | Dent | 330/127 |
| 7,710,301 B2 | 5/2010 | Ueno et al. | |
| 7,714,649 B1 * | 5/2010 | Cripe | 330/251 |
| 7,715,493 B2 * | 5/2010 | Ravi et al. | 375/296 |
| 7,830,159 B1 * | 11/2010 | Lee | 324/679 |
| 8,233,563 B2 * | 7/2012 | Wurm et al. | 375/296 |
| 8,299,851 B2 * | 10/2012 | Zhou et al. | 330/10 |
| 2005/0110568 A1 * | 5/2005 | Robinson et al. | 330/151 |
| 2005/0134377 A1 * | 6/2005 | Dent | 330/124 R |
| 2006/0017500 A1 * | 1/2006 | Hellberg | 330/124 R |
| 2007/0298732 A1 * | 12/2007 | Lee et al. | 455/102 |
| 2008/0075198 A1 * | 3/2008 | Chang et al. | 375/308 |
| 2009/0163154 A1 * | 6/2009 | Fonden et al. | 455/114.2 |
| 2009/0167434 A1 * | 7/2009 | Elmala | 330/124 R |
| 2010/0074367 A1 * | 3/2010 | Kim et al. | 375/296 |
| 2010/0124290 A1 * | 5/2010 | Kablotsky | 375/259 |
| 2011/0103508 A1 * | 5/2011 | Mu et al. | 375/295 |
| 2011/0135035 A1 * | 6/2011 | Bose et al. | 375/300 |
| 2011/0298557 A1 * | 12/2011 | Kobayashi | 332/103 |
| 2012/0069930 A1 * | 3/2012 | Vromans et al. | 375/295 |
| 2012/0081243 A1 * | 4/2012 | Kim et al. | 341/110 |
| 2012/0176195 A1 * | 7/2012 | Dawson et al. | 330/124 R |
| 2012/0243580 A1 * | 9/2012 | Wright | 375/219 |
| 2012/0269293 A1 * | 10/2012 | Peng et al. | 375/297 |
| 2012/0294388 A1 * | 11/2012 | Choi et al. | 375/308 |

OTHER PUBLICATIONS

Frederick H. Raab, "Efficiency of Outphasing RF Power-Amplifier Systems", IEEE Transactions on Communications, vol. COM-33, No. 10, Oct. 1985.*

(Continued)

*Primary Examiner* — Chieh M Fan
*Assistant Examiner* — Bahman Badipour

(57) ABSTRACT

In one embodiment, the present invention includes a transmitter having a baseband, a multiplexer, a digital-to-analog converter unit, and/or a Chireix combiner. The baseband transmits components of an in-phase signal and a quadrature-phase signal to the multiplexer. The multiplexer generates a first signal and/or a second signal which have a phase difference which matches only a single predetermined phase difference. The single predetermined phase difference should be selected to ensure that the Chireix combiner is optimized for efficiency. Thus, a phase of the first signal or the second signal can have a phase of the in-phase signal or the quadrature-phase signal to ensure that the phase difference between the second signal and the first signal matches only the single predetermined phase difference. The Chireix combiner receives the first analog signal and the second analog signal.

19 Claims, 21 Drawing Sheets

OTHER PUBLICATIONS

Todd S. Kaplan, Joseph F. Jensen, Charles H. Fields, M. Frank Chang, "A 2GS/s 3b ΔΣ-Modulated DAC with a Tunable Switched-Capacitor Bandpass DAC Mismatch Shaper", 2004 IEEE International Solid-State Circuits Conference.*

Qureshi et al., *A 90-W Peak Power GaN Outphasing Amplifier With Optimum Input Signal Conditioning*, IEEE Transactions on Microwave Theory and Techniques, vol. 57, No. 8, Aug. 2009, at 1925-35.

* cited by examiner

| Signal | Phase | |
|---|---|---|
| (I,Q) | IDAC | QDAC |
| (1, 1) | 0° | 90° |
| (-1, 1) | 180° | 90° |

Δ = + 90° and −90°

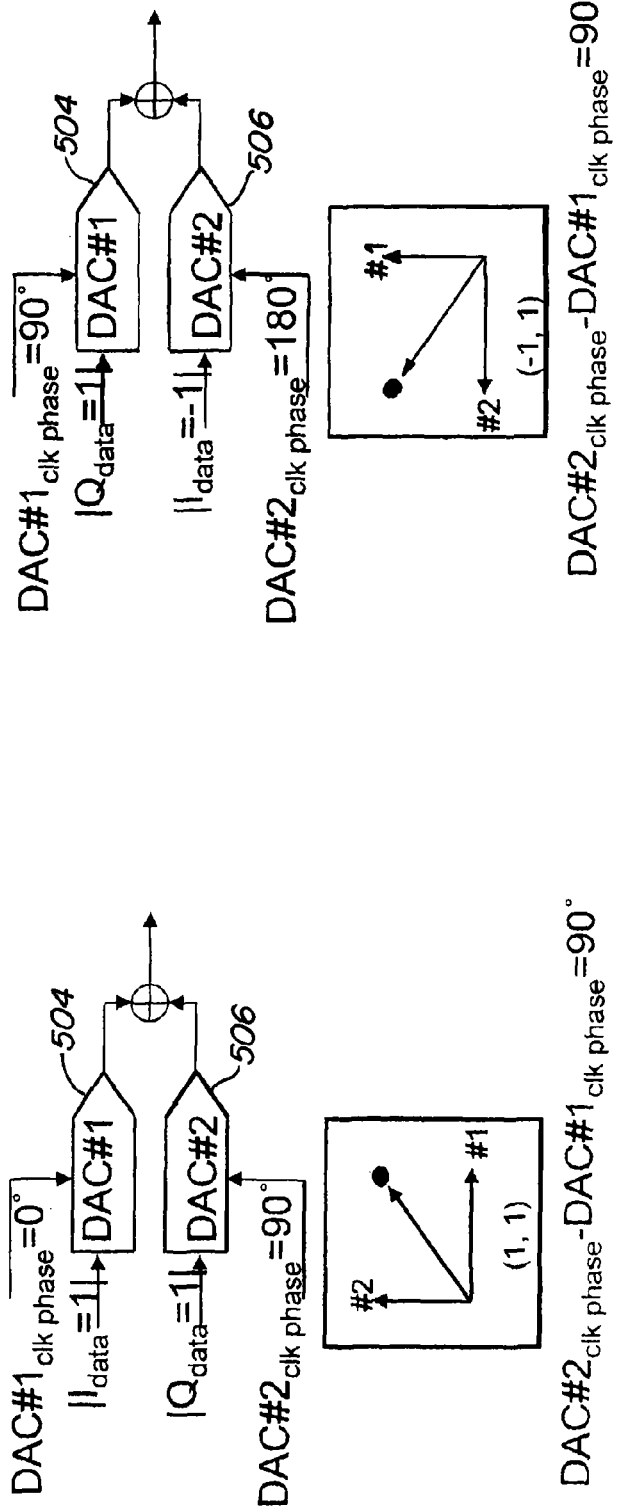

| Case # | Signal (I,Q) | Phase DAC#1 | Phase DAC#2 | Good for Chireix |
|---|---|---|---|---|
| 1 | (1, 1) | 90° | 0° | ✗ |
| 2 | (-1, 1) | 90° | 180° | ✓ |
| 3 | (1, 1) | 0° | 90° | ✓ |
| 4 | (1, -1) | 360° | 270° | ✗ |
| 5 | (1, -1) | 270° | 360° | ✓ |
| 6 | (-1, -1) | 270° | 180° | ✗ |
| 7 | (-1, 1) | 180° | 90° | ✗ |
| 8 | (-1, -1) | 180° | 270° | ✓ |

FIG. 16

| Axis | Signal | Phase of each path [deg] | |
|---|---|---|---|
| | | DAC #1 | DAC #2 |
| | (I,Q) | | |
| (a) | (1,0) | OFF | 0° |
| (b) | (-1,0) | OFF | 180° |
| (c) | (0, 1) | 90° | OFF |
| (d) | (0, -1) | 270° | OFF |

EFFICIENT CARTESIAN TRANSMITTER USING SIGNAL COMBINER

BACKGROUND

1. Field of the Invention

The present invention is related to an efficient Cartesian transmitter, and more specifically an efficient Cartesian transmitter using signal combiner.

2. Description of the Related Art

A conventional transmitter 100 is shown, for example, in FIG. 1. The conventional transmitter 100 can include, for example, a baseband 102, a digital-to-analog converter (DAC) 104, a DAC 106, an upconverter 108, an upconverter 110, an oscillator 112, a combiner 114, a filter 116, and a power amplifier 118. The baseband 102 would transmit, for example, an in-phase signal to the DAC 104 and a quadrature-phase signal to the DAC 106. The upconverter 108 would upconvert the in-phase signal using the oscillator 112 while the upconverter 110 would upconvert the quadrature-phase signal using the oscillator 112. The resulting upconverted signals would be combined by the combiner 114 and output to the filter 116. In one embodiment, the combiner 114 can be part of a Wilkinson linear power combiner, or it can be just a voltage or current summation at an output of the mixers. The filter 116 will output a filtered signal to the power amplifier 118. While the transmitter 100 demonstrated linear power amplification of in-phase and quadrature-phase signals, the transmitter dictated power amplifier operation in back-off mode. This results in considerable amounts of energy being wasted.

A conventional transmitter 200 is shown, for example, in FIG. 2. The conventional transmitter 200 also utilizes linear or saturated amplification of in-phase and quadrature-phase signals. The difference being that in the conventional transmitter 200, the power amplifiers are now utilized prior to the combination of the upconverted signals as shown by the inclusion and placement of the power amplifiers 220 and 222. However, with twice as many power amplifiers, more power may be consumed in the conventional transmitter 200 than in the conventional transmitter 100. For example, the use of the Wilkinson combiner may be inefficient when both the power amplifiers 220 and 222 are active. In such a case, half of the power may be wasted in the combiner 114 as heat in the resistor. In addition, such architecture of the conventional transmitter 200 may require twice as much area as the conventional transmitter 100.

A conventional transmitter 300 is shown, for example, in FIG. 3. In FIG. 3, the conventional transmitter 300 is a polar direct conversion Cartesian transmitter. Thus, instead of using Cartesian components, the conventional transmitter 300 utilizes polar components such as amplitude and phase. However, it still utilizes multiple power amplifiers as seen in the power amplifiers 220 and 222. Again, this consumes excess power and the use of the Wilkinson combiner is also inefficient.

A conventional transmitter 400 is shown, for example, in FIG. 4. In FIG. 4, the conventional transmitter 400 utilizes band-pass DACs 404 and 406 instead of the DACs 104 and 106 in the conventional transmitter 100. However, the summation provided by the combiner 114 can be inefficient if the Wilkinson combiner is used.

Thus, there is a need for an efficient Cartesian transmitter, and more specifically an efficient Cartesian transmitter using signal combiner.

SUMMARY

The present invention is directed to an efficient Cartesian transmitter, and more specifically, an efficient Cartesian transmitter using signal combiner.

In one embodiment, the present invention includes a transmitter having a baseband, a multiplexer, a digital-to-analog converter unit, and/or a Chireix combiner. The Chireix combiner is a modified power combiner that can modulate a load so that for a given outphasing angle between two input signals, a combined output is obtained at a peaking efficiency. A Chireix combiner can be seen, for example, at Adams et al. (U.S. Pat. No. 6,061,010), and Qureshi et al., *A 90-W Peak Power GaN Outphasing Amplifier With Optimum Input Signal Conditioning*, IEEE TRANSACTIONS ON MICROWAVE THEORY AND TECHNIQUES, Vol. 57, No. 8, August 2009, at 1925-35, which are hereby incorporated by reference in their entirety. The baseband transmits components of an in-phase signal and a quadrature-phase signal to the multiplexer. The multiplexer generates a first signal and/or a second signal which have a phase difference which matches only a single predetermined phase difference. Thus, a phase of the first signal can have a phase of the in-phase signal or the quadrature-phase signal to ensure that the phase difference between the second signal and the first signal matches only a single predetermined phase difference. Likewise, the second signal can have a phase of the in-phase signal or the quadrature-phase signal to ensure that the phase difference between the second signal and the first signal matches only a single predetermined phase difference.

The DAC unit receives the first signal and the second signal and converts them into a first analog signal and a second analog signal respectively. The Chireix combiner can receive the first analog signal and the second analog signal. The use of the Chireix combiner can allow the transmitter to be more efficient than transmitters which include a Wilkinson combiner. Furthermore, the single predetermined phase difference should be selected to ensure that the Chireix combiner is optimized for efficiency.

In one embodiment, the present invention includes a transmitter including a baseband outputting components of an in-phase signal and components of a quadrature-phase signal, and a multiplexer receiving the components of the in-phase signal and the components of the quadrature-phase signal, and outputting a first signal and a second signal, wherein a phase of the first signal is selected to correspond to a phase of the in-phase signal or a phase of the quadrature-phase signal, and a phase of the second signal is selected to correspond to the phase of the in-phase signal or the phase of the quadrature-phase signal, to ensure that a phase difference between the second signal and the first signal matches only a single predetermined phase difference. This can improve an overall efficiency of the transmitter.

In another embodiment, the present invention is a transmitter including a baseband outputting components of an in-phase signal and components of a quadrature-phase signal, a multiplexer receiving the components of the in-phase signal and the components of the quadrature-phase signal, and outputting a first signal and a second signal, wherein a phase of the first signal is selected to correspond to a phase of the in-phase signal or a phase of the quadrature-phase signal, and a phase of the second signal is selected to correspond to the phase of the in-phase signal or the phase of the quadrature-phase signal, to ensure that a phase difference between the second signal and the first signal matches only a single predetermined phase difference of positive 90° or negative 90°. The transmitter can also include a first digital-to-analog converter receiving the first signal and converting the first signal into a first analog signal, a second digital-to-analog converter receiving the second signal and converting the second signal into a second analog signal, and a Chireix combiner, wherein the Chireix combiner receives the first analog signal and the second analog signal.

In yet another embodiment, the present invention is a method for outputting signals in a transmitter including outputting, using a baseband, components of an in-phase signal and components of a quadrature-phase signal, receiving, using a multiplexer, the components of the in-phase signal and the components of the quadrature-phase signal, generating, using the multiplexer, a first signal and a second signal, selecting, using the multiplexer, a phase of the first signal to correspond to a phase of the in-phase signal or a phase of the quadrature-phase signal to ensure that a phase difference between the second signal and the first signal matches only a single predetermined phase difference, selecting, using the multiplexer, a phase of the second signal to correspond to the phase of the in-phase signal or the phase of the quadrature-phase signal to ensure that the phase difference between the second signal and the first signal matches only the single predetermined phase difference, and outputting, using the multiplexer, the first signal and the second signal.

BRIEF DESCRIPTION OF THE DRAWINGS

The features, obstacles, and advantages of the present invention will become more apparent from the detailed description set forth below when taken in conjunction with the drawings, wherein:

FIG. 13 is a table of IQ signal values and corresponding phases of signal input for digital-to-analog converters;

FIG. 14 is a diagram of digital-to-analog converters in operation according to an embodiment of the present invention;

FIG. 15 is a diagram of digital-to-analog converters in operation according to an embodiment of the present invention;

FIG. 16 is a table of IQ signal values, corresponding phases of signal input for digital-to-analog converters, and corresponding Chireix performance according to an embodiment of the present invention;

DETAILED DESCRIPTION

Figure 1:
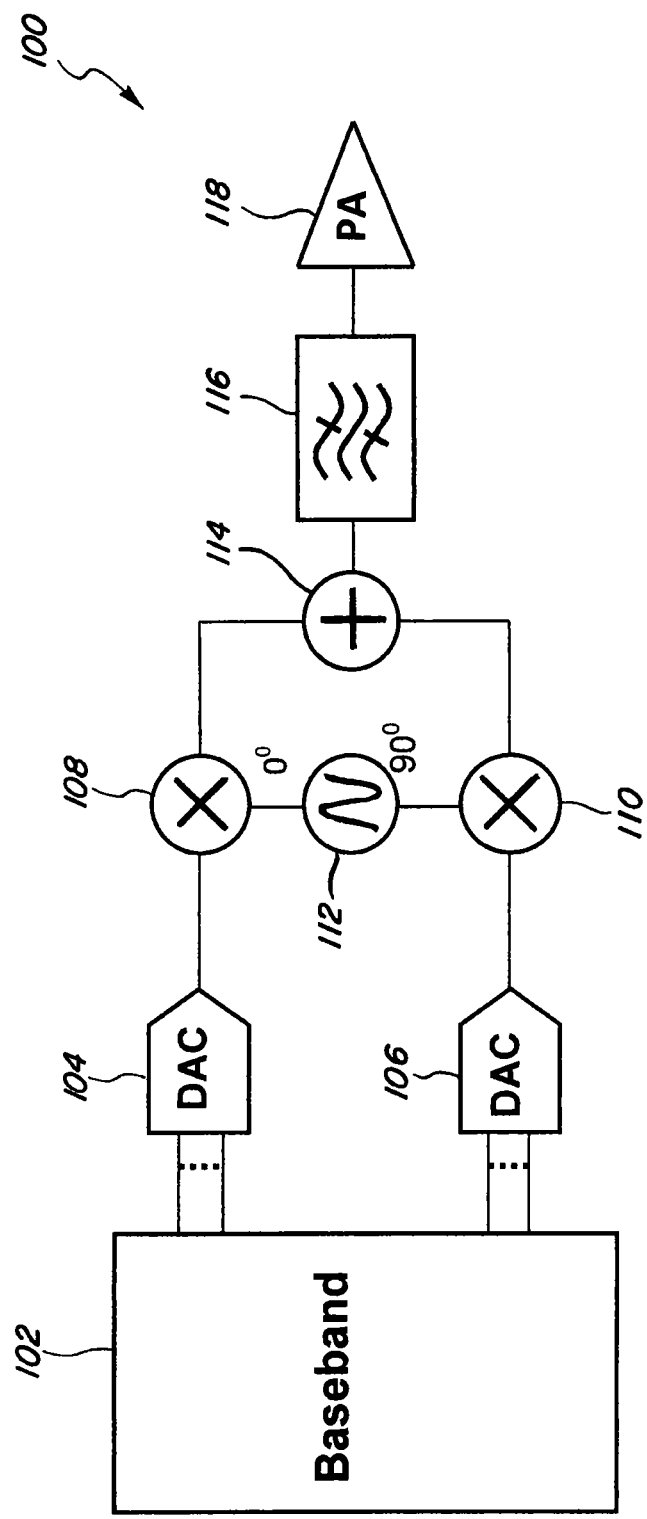
FIG. 1 is a schematic diagram of a conventional transmitter.
Figure 2:
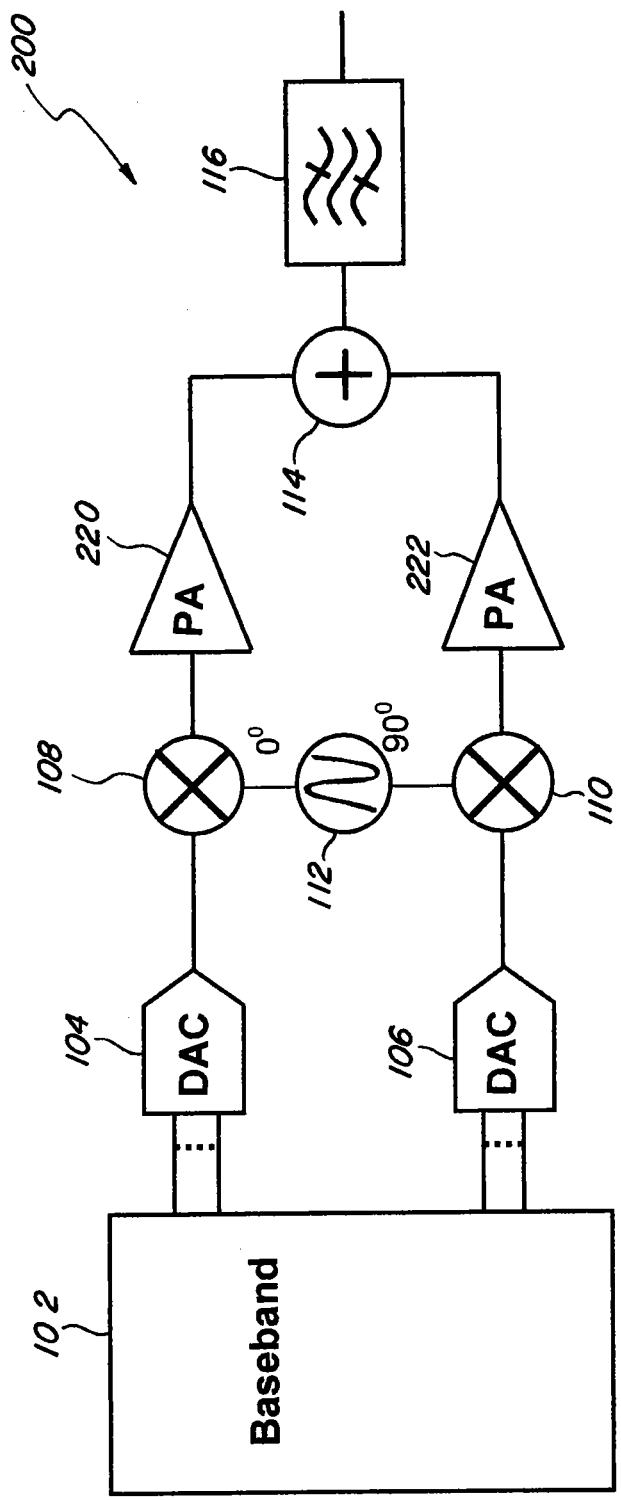
FIG. 2 is a schematic diagram of a conventional transmitter.
Figure 3:
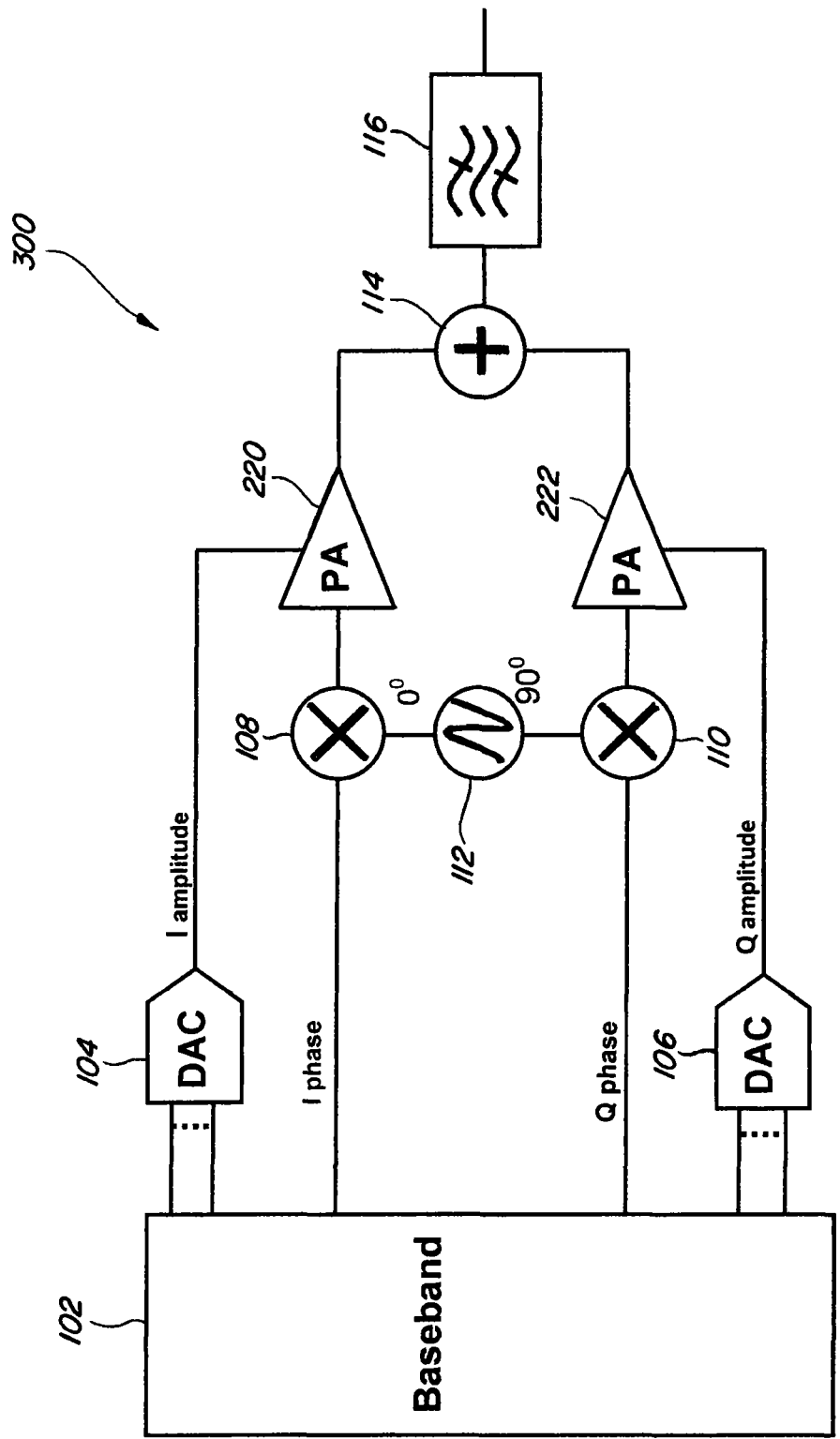
FIG. 3 is a schematic diagram of a conventional transmitter.
Figure 4:
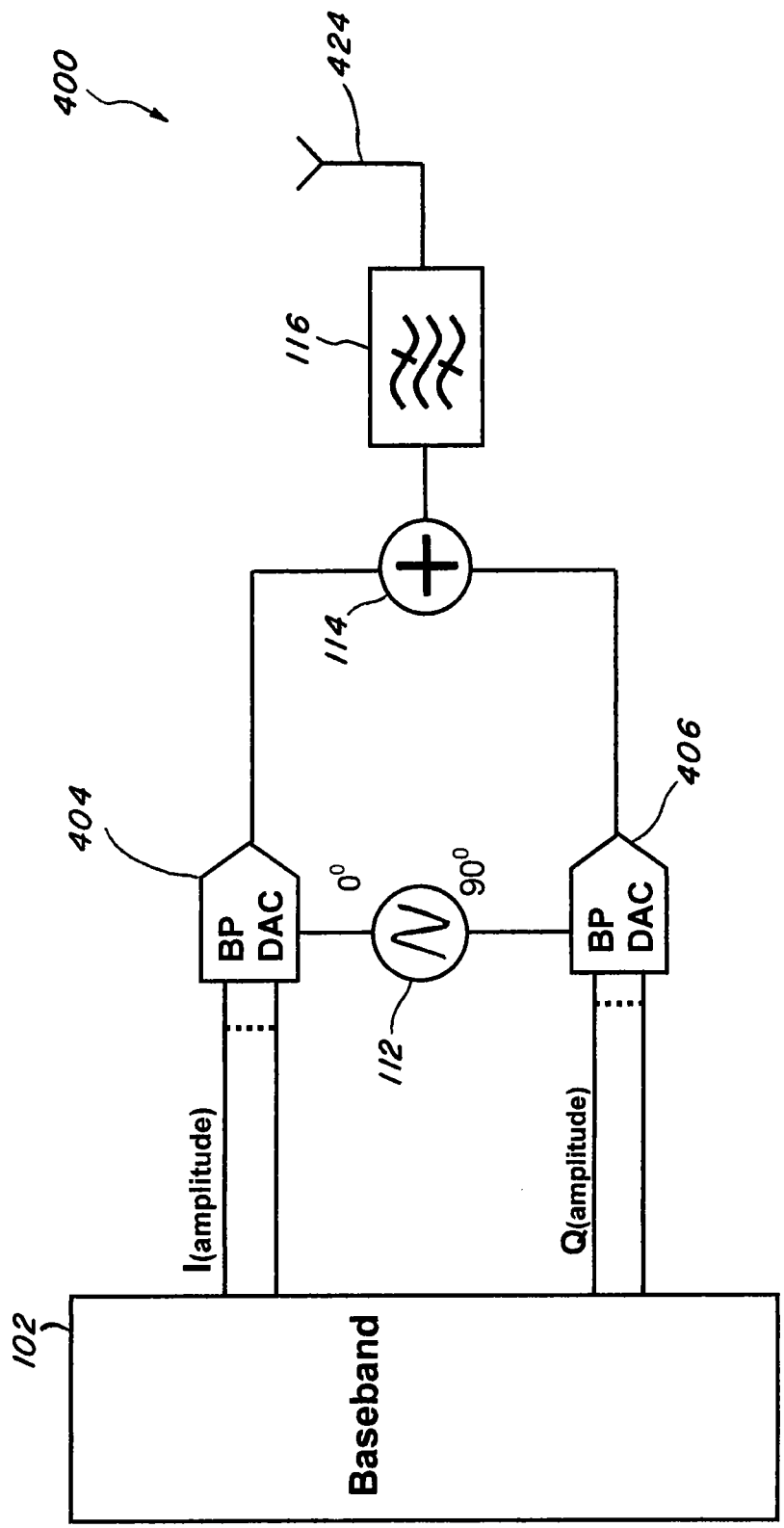
FIG. 4 is a schematic diagram of a conventional transmitter.
Figure 5:
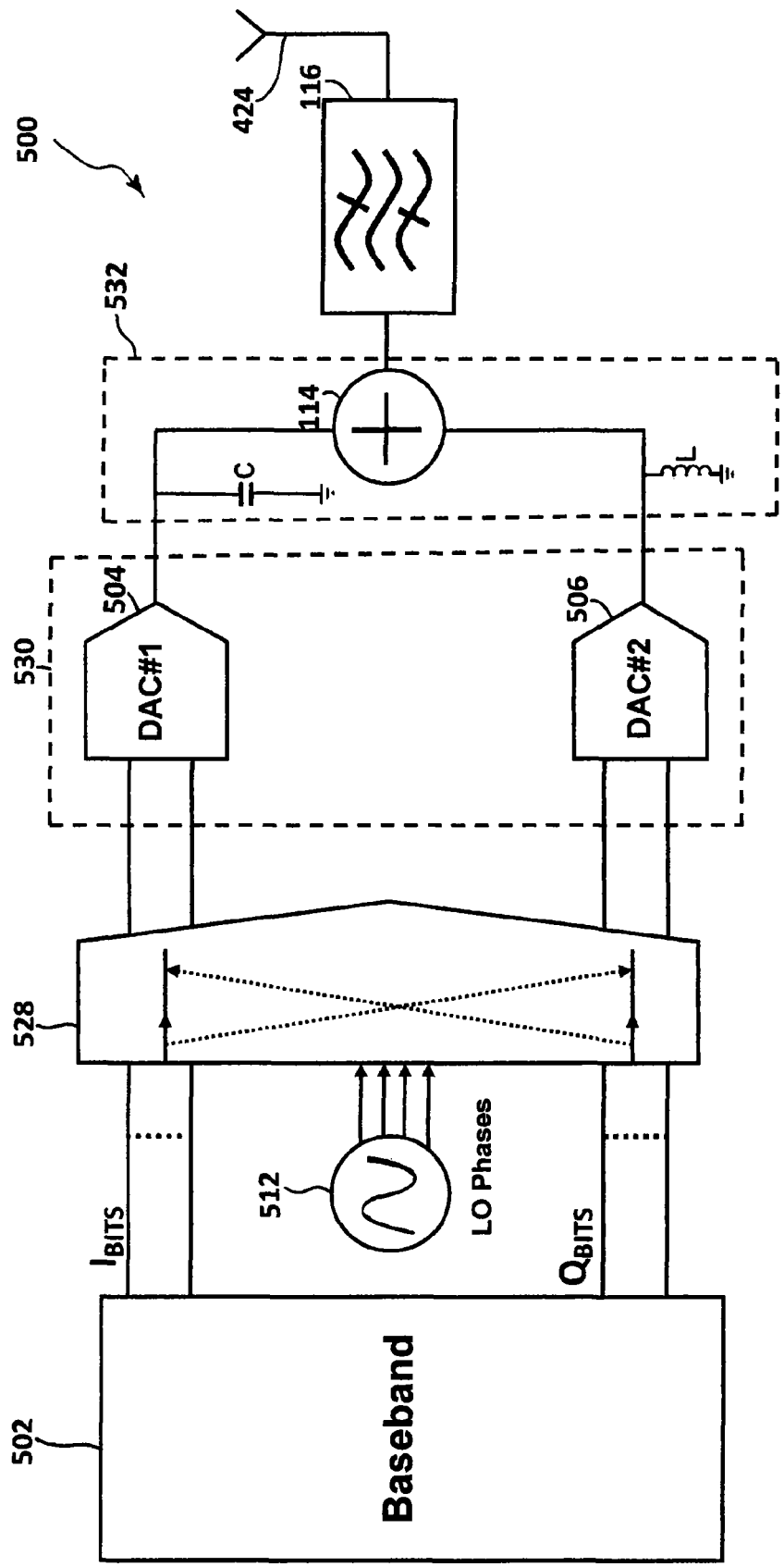
FIG. 5 is a schematic diagram of a transmitter including a multiplexer according to an embodiment of the present invention.

In one embodiment, the present invention can include, for example, a transmitter 500 as shown in FIG. 5. The transmitter 500 can be, for example, an efficient Cartesian transmitter. The transmitter 500 can include, for example, a baseband 502, an oscillator 512, a multiplexer 528, a DAC unit 530, and/or a Chireix combiner 532.

The baseband 502 can transmit, for example, components of an in-phase signal and a quadrature-phase signal to the multiplexer 528. The multiplexer 528 receives the components of the in-phase signal, the quadrature signal, and phases such as local oscillator ("LO") phases from the oscillator 512. The oscillator 512 can be, for example, a LO. Thus, instead of transmitting the phases directly from the oscillator 512 to the DAC unit 530, the phases are transmitted to the multiplexer 528 so that the multiplexer 528 can select the appropriate phases to be used.

The multiplexer 528 then generates a first signal and a second signal which are transmitted to the DAC unit 530. A phase of the first signal and a phase of the second signal either correspond to a phase of the in-phase signal, or a quadrature-phase signal. The phase of the first signal and the phase of the second signal are selected so that a phase difference between the phase of the second signal and the phase of the first signal matches only a single predetermined phase difference. The single predetermined phase difference should be selected to optimize an efficiency of the Chireix combiner 532.

In one embodiment, the single predetermined phase difference is positive 90°. For example, if the in-phase signal has a phase of 0° and the quadrature-phase signal has a phase of 90°, then the phase of the first signal is selected to correspond to the phase of the in-phase signal (0°), and the phase of the second signal is selected to correspond to the phase of the quadrature-phase signal (90°). On the other hand, if the in-phase signal has a phase of 180°, and the quadrature-phase signal has a phase of 90°, then the phase of the first signal is selected to correspond to the phase of the quadrature-phase signal (90°) and the phase of the second signal is selected to correspond to a phase of the in-phase signal (180°).

As shown in FIG. 5, the DAC unit 530 includes, for example, a DAC 504 and a DAC 506. In one embodiment, the DAC unit 530 can be, for example a band-pass DAC unit, and the DAC 504 and the DAC 506 can each be a band pass DAC. The DAC 504 receives the first signal from the multiplexer 528 and the DAC 506 receives the second signal from the multiplexer 528. The DAC 504 converts the first signal into a first analog signal, while the DAC 506 converts the second signal into a second analog signal. The DAC 504 and the DAC 506 pass the first analog signal and the second analog signal, respectively, to the Chireix combiner 532.

The Chireix combiner 532 includes an inductor portion and a capacitor portion. As seen in FIG. 5, the capacitor portion receives the first analog signal from the DAC 504 while the inductor portion receives the second analog signal from the DAC 506. The Chireix combiner 532 will combine the first analog signal and the second analog signal using the combiner 114. The combined output is transmitted to the filter 116, which outputs a filtered signal to the antenna 424.

Since an efficiency of the Chireix combiner can depend on the phase difference between the first analog signal and the second analog signal, the single predetermined phase difference should be selected to optimize an efficiency of the Chireix combine 532. For example, the Chireix combiner 532 can operate efficiently when there is a positive 90° phase difference between the second analog signal and the first analog signal. That is, the signal received by the inductor portion should be lagging behind the signal received by the capacitor portion of the Chireix combiner 532 by 90°. Of course, the single predetermined phase difference can also be negative 90° if the configuration of the capacitor portion and/or the inductor portion are rearranged. Furthermore, the single predetermined phase difference can also be, for example, 0° or other appropriate values.

Figure 6:
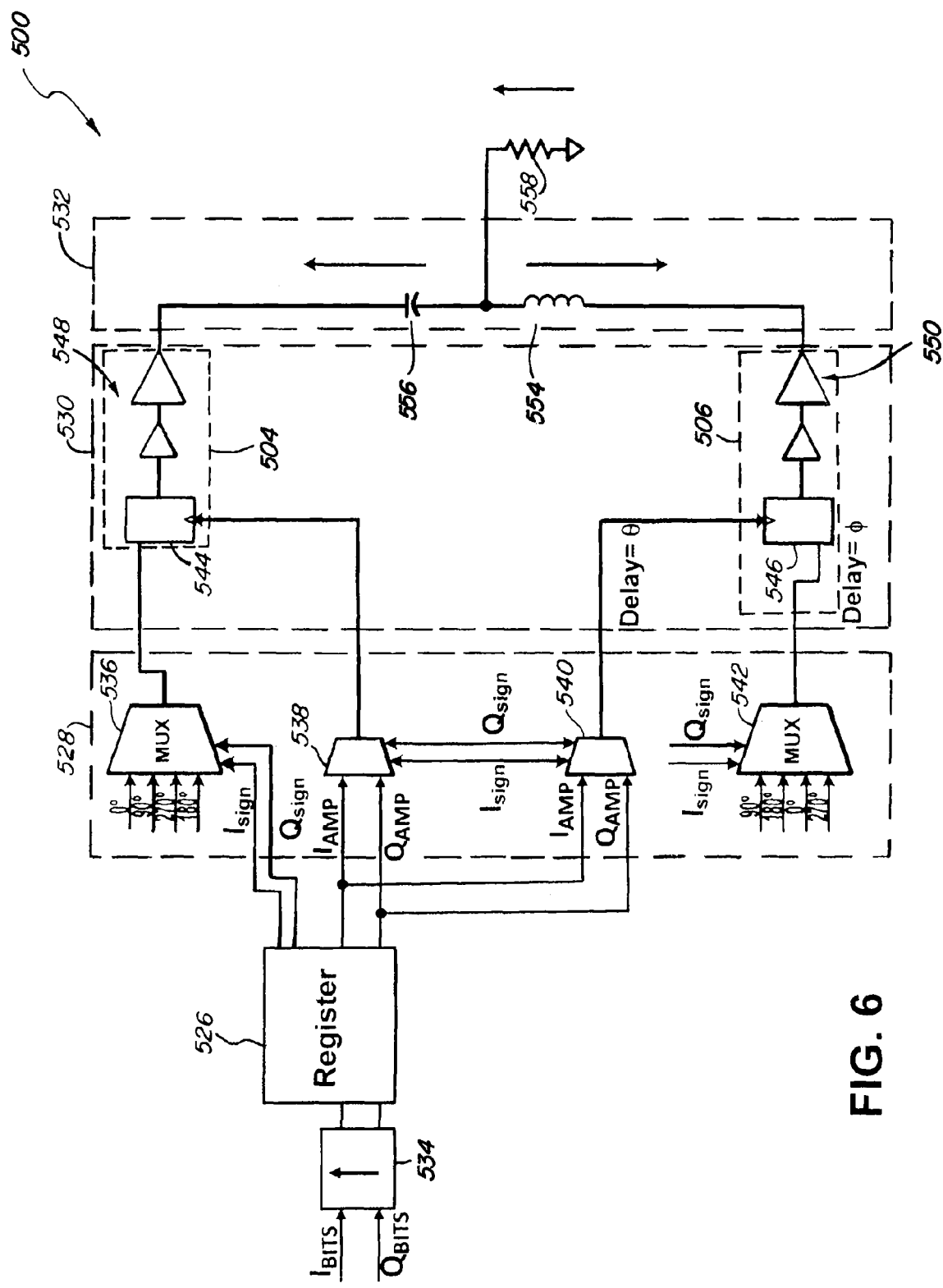
FIG. 6 is a schematic diagram of a multiplexer, a digital-to-analog converter unit, and a Chireix combiner according to an embodiment of the present invention.

The multiplexer 528, the DAC unit 530, and/or a Chireix combiner 532 can be seen in more detail in FIG. 6. As seen in FIG. 6, the transmitter 500 can also include, for example, an upsampler 534 located in the baseband 502, in the multiplexer 528, or between the baseband 502 and the multiplexer 528. The upsampler 534 can receive I-bits and Q-bits including sign and amplitude information of the in-phase signal and the quadrature-phase signal, respectively, from the baseband 502. The upsampling by the upsampler 534 pushes the image of the I-bits and the Q-bits further away, in preparation for eventual conversion to an analog signal. This can also reduce the noise of the I-bits and the Q-bits. After being upsampled by the upsampler 534, the I-bits and the Q-bits are transmitted to a register 526. From the register 526, the sign information, indicated as I-sign and Q-sign indicate, and the amplitude information, indicated as I-amp and Q-amp, are transmitted to the multiplexer 528.

As seen in FIG. 6, the multiplexer 528 can include, for example, phase selectors 536 and 542, and delay selection units 538 and 540. The phase selectors 536 and 538, and the delay selection units 538 and 540 can be implemented using multiplexers. The phase selectors 536 and 542 can receive phases such as LO phases from the oscillator 512 (FIG. 5). In one embodiment, the phase selector 536 receives the phases 0°, 90°, 270°, and 180° from the oscillator 512 while the phase selector 538 receives the phases 90°, 180°, 0°, and 270° from the oscillator 512. The phase selectors 536 and 542 also receive the I-sign and the Q-sign from the upsampler 534. Based on the sign indicated in the I-sign and the Q-sign, the phase selectors 536 and 542 output a first signal and a second signal having the desired phases to the DAC unit 530. The delay selection units 538 and 540 receive the I-amp, the Q-amp, the I-sign, and the Q-sign and output delayed signals to the DAC unit 530.

The DAC 504 and the DAC 506 receive the first signal and the second signal, covert them into analog signals using the delayed signals from the delay selection units 538 and 540. The DAC 504 and the DAC 506 output a first analog signal and a second analog signal to the Chireix combiner 532. In one embodiment, the DAC 504 can include, for example, a synchronization unit 544 and amplifiers 548, while the DAC 506 can include, for example, a synchronization unit 546 and amplifiers 550.

The synchronization units 544 and 546 receive the first signal and the second signal and output them to the amplifiers 548 and 550 when the synchronization units 544 and 546 receive the delayed signals from the delay selection units 538 and 540, respectively. In one embodiment, the delayed signals can be used to ensure the proper alignment of the first signal and the second signal. For example, the second signal output by the phase selector 542 can have a delay of $\phi$. However, the desired timing for reception of the second signal by the amplifiers 550 may be at approximately a delay of $\theta$, which is later than the delay of $\phi$. Thus, the delay signal from the delay selection unit 542 can be set to have a delay of $\theta$ to ensure that the synchronization unit 546 does not output the second signal to the amplifiers 550 until the delay $\theta$ is reached. A similar principle is used for the delay selection unit 538.

Although only two synchronization units are used, any number of synchronization units can be used. In one embodiment, the number of synchronization units used can correspond to a number of bits in the in-phase signal and the quadrature-phase signal. Similarly the number of delay selection units used can also be varied. In one embodiment, the number of delay selection units used can correspond to a number of bits in the in-phase signal and the quadrature-phase signal.

The Chireix combiner 532 includes an inductor portion including an inductor 554, and a capacitor portion including a capacitor 556. The capacitor portion receives the first analog signal while the inductor portion receives the second analog signal. The first analog signal and the second analog signal are combined using the resistor 558. In one embodiment, the resistor 558 can be, for example, the combiner 114.

Figure 7:
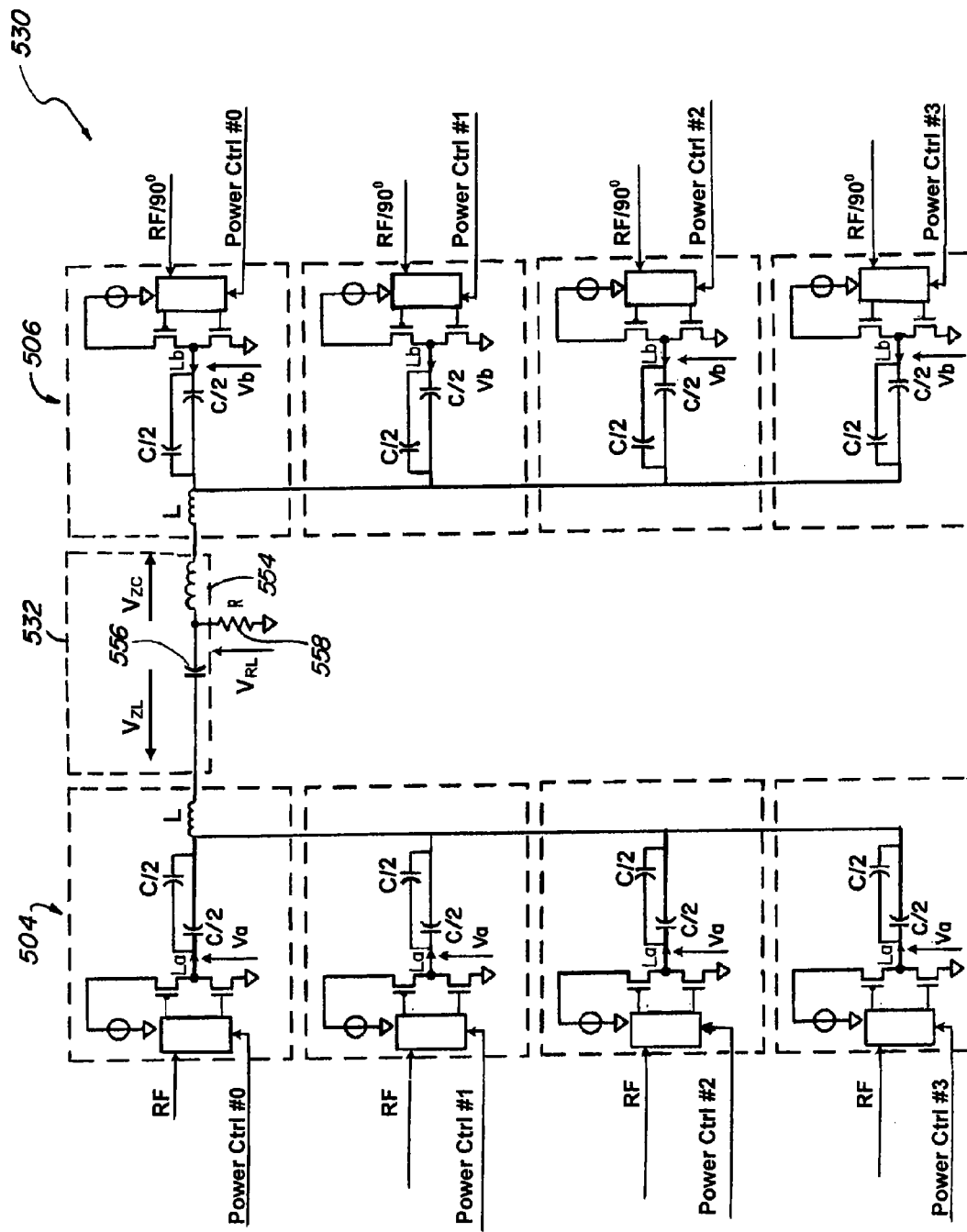
FIG. 7 is a schematic diagram of a digital-to-analog converter unit, and a Chireix combiner according to an embodiment of the present invention.

The DAC unit 530 and the Chireix combiner 532 can be seen, for example, in FIG. 7. In one embodiment, as seen in FIG. 7, the DAC 548 and the DAC 550 can each be a split capacitor band-pass DAC. The use of the split capacitor band-pass DAC increases power efficiency. However, other types of DAC may also be used, especially where power efficiency is increased for the transmitter 500.

Figure 8:
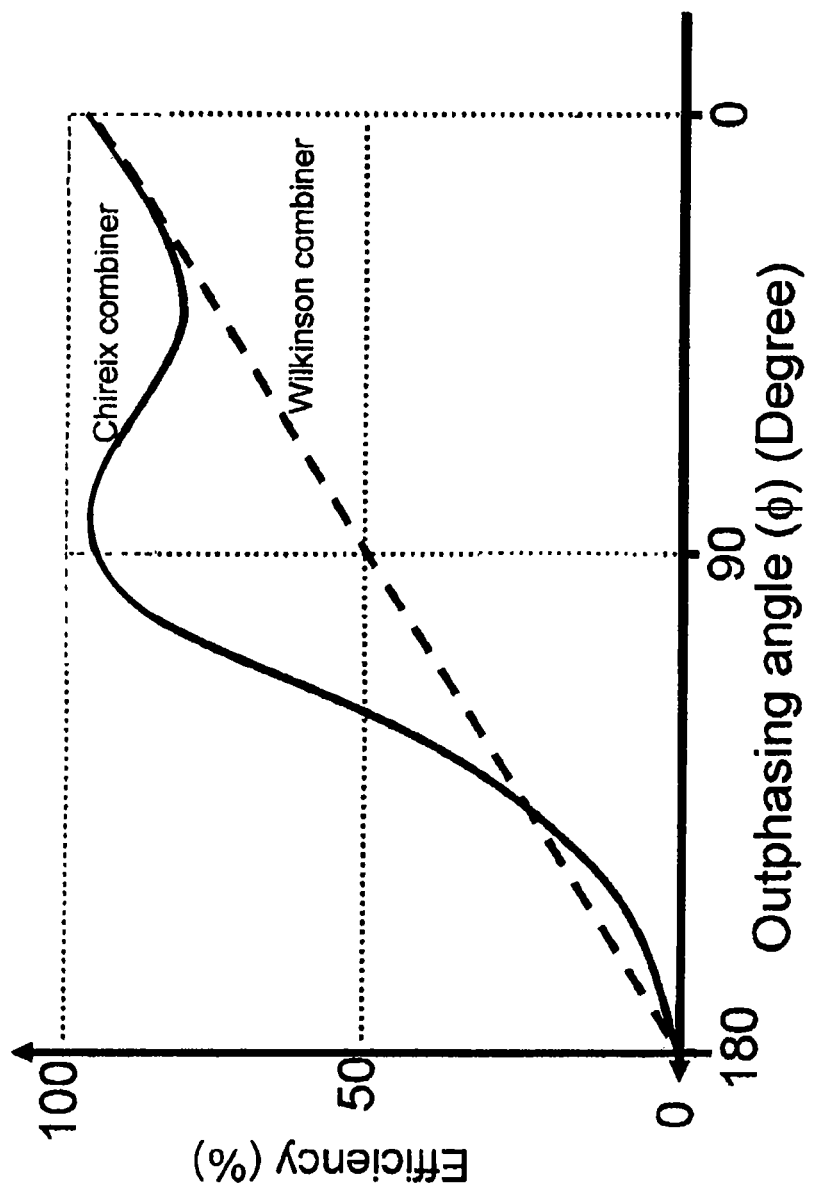
FIG. 8 is a comparative graph of Chireix combiner efficiency and Wilkinson combiner efficiency.

FIG. 8 depicts, for example, advantages of using the Chireix combiner 532 over a Wilkinson combiner. As can be seen, at a positive 90° phase difference, the efficiency of the Chireix combiner 532 is particularly high and approaches, for example, 90% or more. Thus, the multiplexer 528 of the transmitter 500 ensures that a positive 90° phase difference occurs between the second signal and the first signal, which leads to positive second analog signal and a positive first analog signal which is received by the Chireix combiner 532.

Figure 9:
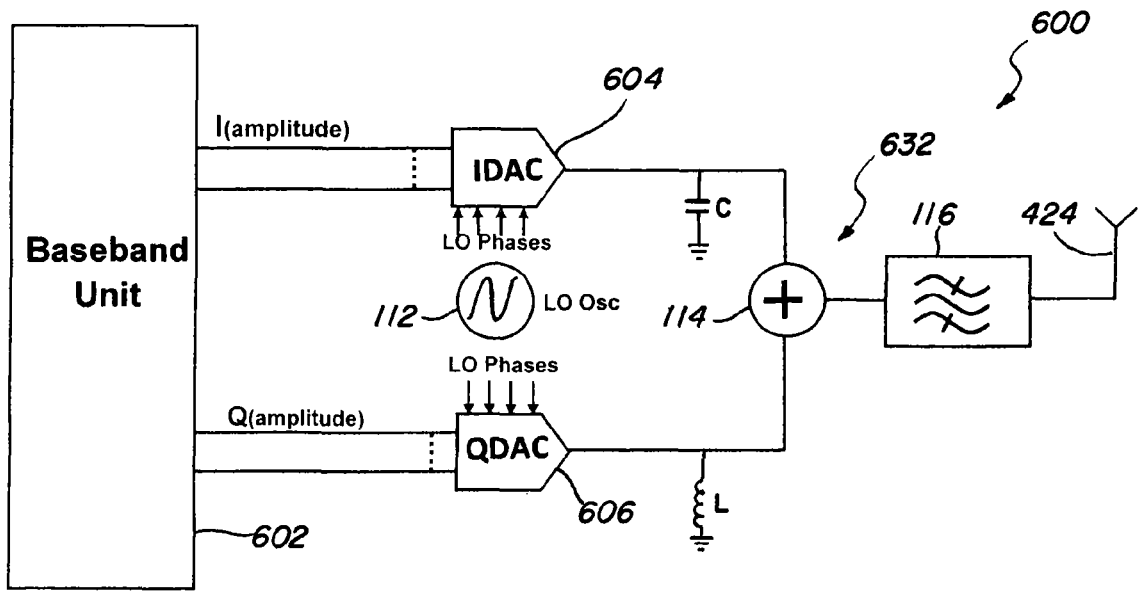
FIG. 9 is a transmitter including a Chireix combiner.
Figure 10:
FIG. 10 is a table of IQ signal values and corresponding phases of signal input for digital-to-analog converters.

The use of the multiplexer in the present invention is advantageous, even over a transmitter including a Chireix combiner. For example, a conventional transmitter 600 is shown in FIG. 9 without a multiplexer of the present invention. As seen in the table on FIG. 10, an IDAC 604 and a QDAC 606 can receive phases based on an IQ signal of (1,1) or (−1,1) from a baseband 602. More specifically, the IDAC 604 can receive in-phase information, while the QDAC 606 can receive quadrature-phase information. The output of the IDAC 604 and the QDAC 606 are combined using the Chireix combiner 632 including, for example, the combiner 114. The output of the Chireix combiner 632 is filtered using the filter 116 and output through the antenna 424.

Figure 12:
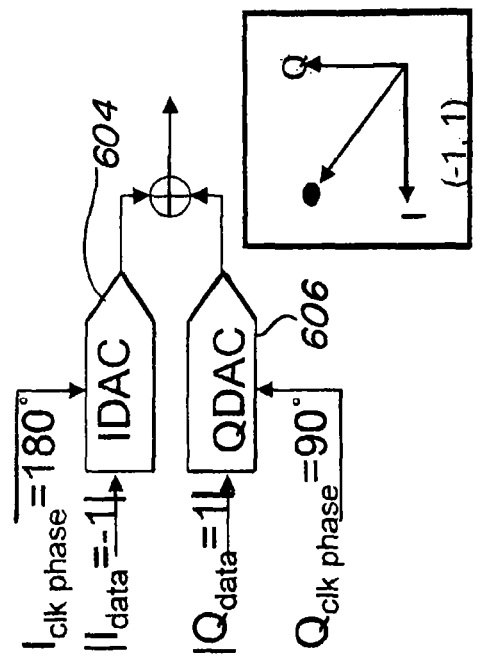
FIG. 12 is a diagram of digital-to-analog converters in operation.
Figure 11:
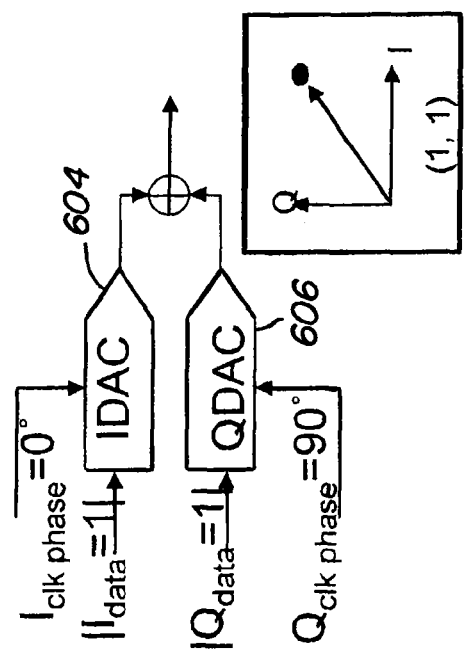
FIG. 11 is a diagram of digital-to-analog converters in operation.

With respect to the value of (1,1), the signal output from the IDAC 604 will have a phase of 0°, while the signal output from the QDAC 606 will have a phase of 90°. This is a positive 90° phase difference and can be confirmed, for example, in FIG. 11. That is, the phase of the signal output from the IDAC, which is fed to a capacitor portion of the Chireix combiner 632, is subtracted from the phase of the signal output from the QDAC, which is fed to an inductor portion of the Chireix combiner 632 (90°−0°=90°). However, with respect to the value of (−1,1), the signal output from the IDAC will have a phase of 180°, while the signal output from QDAC will have a phase of 90° for a negative 90° phase difference (90°−180°=−90°). This can be confirmed, for example, in FIG. 12. This is inefficient because as seen in the graph on FIG. 8, the Chireix combiner works optimally at a positive 90° phase difference.

In contrast, in the present invention, as seen in the table on FIG. 13, the DAC#1 corresponding to the DAC 504 and the DAC#2 corresponding to the DAC 506 can output signals with different phases than the IDAC 604 and the QDAC 606 based on an IQ signal of (1,1) or (−1,1) because the phases of the signals it receives are strategically selected by the multiplexer 528 (FIG. 6). That is, the multiplexer 528 selects the phase of the first signal and the phase of the second signal such that the first analog signal and the second analog signal have a phase difference equal to only a single predetermined phased difference, such as positive 90°.

For example, for the IQ signal of (1,1), the DAC 504 receives the first signal having a phase of 0°, while the DAC 506 receives the second signal having a phase of 90° as shown in FIG. 14. Thus, the output of the first analog signal and the second analog signal by the DAC 504 and the DAC 506 is 0° and 90° respectively. The resulting phase difference matches the predetermined phase difference of 90° (90°−0°=90°). However, for the IQ signal of (−1,1), the multiplexer 528 switches the phase of the signals that the DAC 504 and the DAC 506 receives. Thus, the DAC 504 receives the first signal having a phase of 90° instead of 180°, while the DAC 506 receives the second signal having a phase of 180° instead of 90°, as shown in FIG. 15. This ensures that the DAC 504 outputs a first analog signal having a phase of 90°, and the DAC 506 outputs a second analog signal having a phase of 180°, which results in a phase differences of positive 90° instead of negative 90° (180°−90°=90°).

Without the multiplexer 528, the DAC 504 would have received the first signal having a phase of 180°, while the DAC 506 would have received the second signal having a phase of 90°. The first analog signal would have a phase of 180° and the second analog signal would have a phase of 90°, resulting in a phase difference of negative 90°.

FIG. 16 depicts, for example, a table of the IQ values which are good for a Chireix combiner, or which may pose problems for the Chireix combiner. As seen in FIG. 16, the same IQ values may be achieved with the DAC 504 (DAC#1) and the DAC 506 (DAC#2) switch the phases of the signals they receive. Thus, FIG. 16 also indicates the IQ values where the multiplexer 528 may be especially beneficial.

For example, those values which pose problems for a Chireix combiner may be aided by the use of the multiplexer 528 to switch the phase of the signals sent to the DAC 504 (DAC#1) and the DAC 506 (DAC#2). Those IQ values can include, for example, (1,1) (case #1), (1,−1) (case #4), (−1,−1) (case #6), and (−1,1) (case #7). As seen in FIG. 16, (1,1) can be represented by the phase signals of 90° and 0° as indicated by case #1. However, in case #1, the DAC 504 (DAC#1) receives the first signal with the 90° phase and the DAC 504 (DAC#2) receives the second signal with the 0° phase. Using the multiplexer 528, the DAC 504 (DAC#1) receives the first signal with a 0° phase, while the DAC 506 (DAC#2) receives the second signal with a 90° phase as indicated by case #3. A similar process can be performed for the IQ values (1,−1) (case #4), (−1,−1) (case #6), and (−1,1) (case #7).

Figures 17, 18:
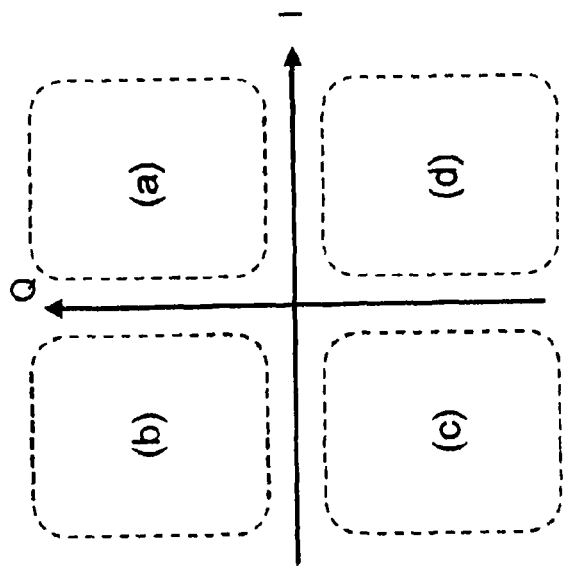
FIG. 17 is a table of IQ signal values, and corresponding phases of signal input for digital-to-analog converters according to an embodiment of the present invention.
FIG. 18 depicts quadrants of a graph for IQ signal values according to an embodiment of the present invention.
Figure 19:
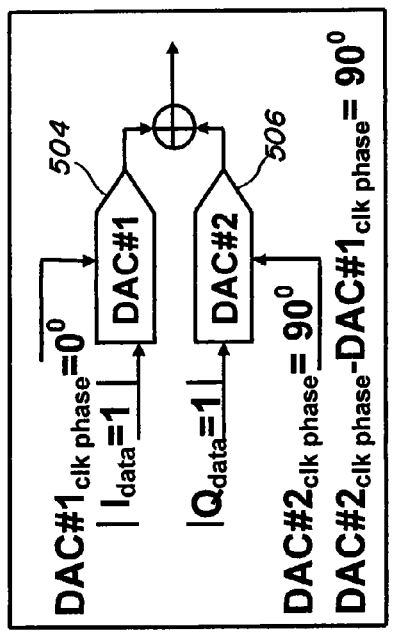
FIG. 19 is a diagram of digital-to-analog converters in operation according to an embodiment of the present invention.
Figure 20:
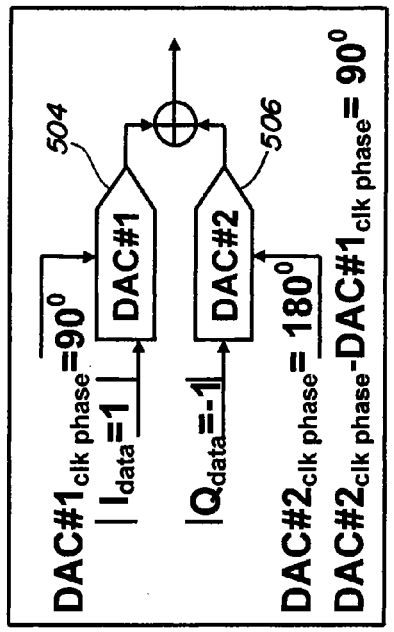
FIG. 20 is a diagram of digital-to-analog converters in operation according to an embodiment of the present invention.
Figure 21:
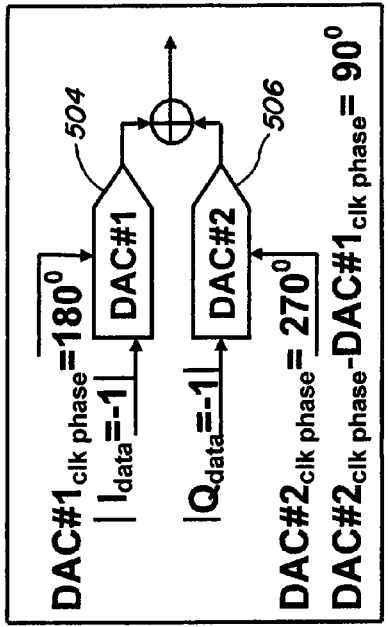
FIG. 21 is a diagram of digital-to-analog converters in operation according to an embodiment of the present invention.
Figure 22:
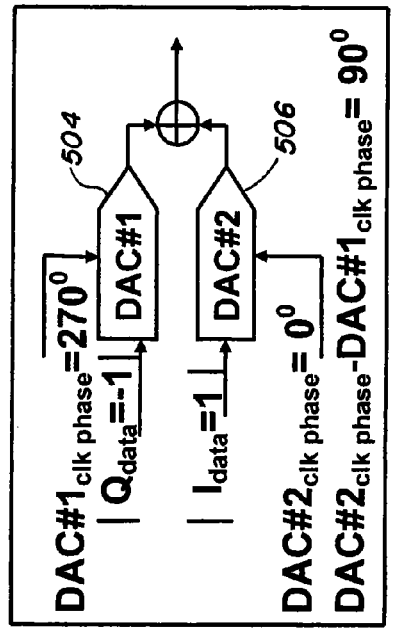
FIG. 22 is a diagram of digital-to-analog converters in operation according to an embodiment of the present invention.

Thus, as seen in FIG. 17, instead of using IQ values (1,1) (case #1), (1,−1) (case #4), (−1,−1) (case #6), and (−1,1) (case #7), their corresponding cases can be used, which are good for the Chireix combiner. Thus, IQ values (1,1) (case #3), (−1,1) (case #2), (−1,−1) (case #8), and (1,−1) (case #5) can be used instead. These IQ values can be located in the quadrants (a), (b), (c), and (d) depicted in FIG. 18.

The beneficial use of (1,1) (case #3), (−1,1) (case #2), (−1,−1) (case #8), and (1,−1) (case #5) results in a positive 90° phase difference between the second analog signal and the first analog signal, as seen in FIGS. 19-22.

Figures 23, 24:
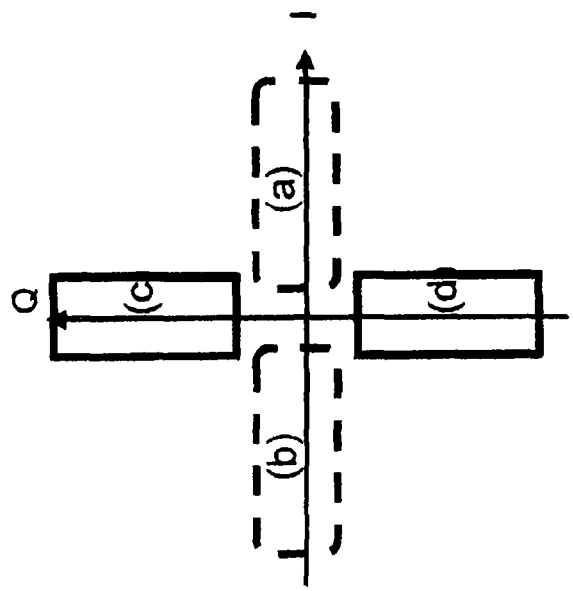
FIG. 23 is a table of IQ signal values and corresponding phases of signal input for digital-to-analog converters.
FIG. 24 depicts axis of a graph for IQ signal values according to an embodiment of the present invention.
Figure 25:
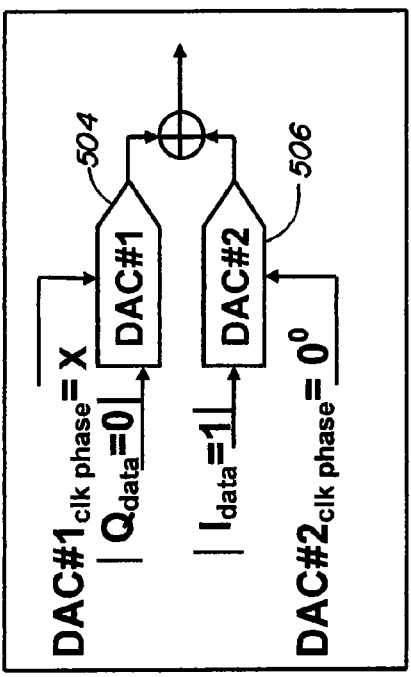
FIG. 25 is a diagram of digital-to-analog converters in operation according to an embodiment of the present invention.
Figure 26:
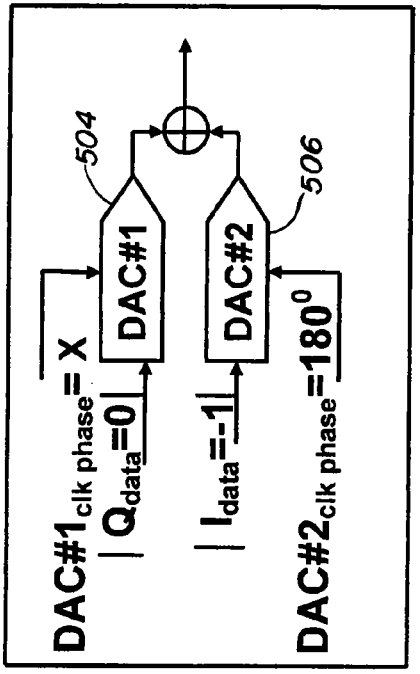
FIG. 26 is a diagram of digital-to-analog converters in operation according to an embodiment of the present invention.
Figure 27:
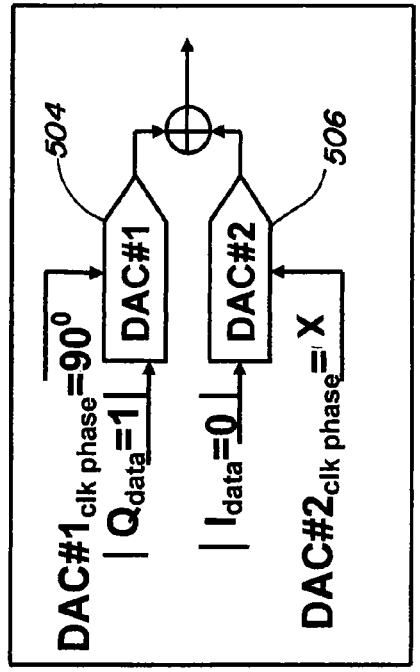
FIG. 27 is a diagram of digital-to-analog converters in operation according to an embodiment of the present invention.
Figure 28:
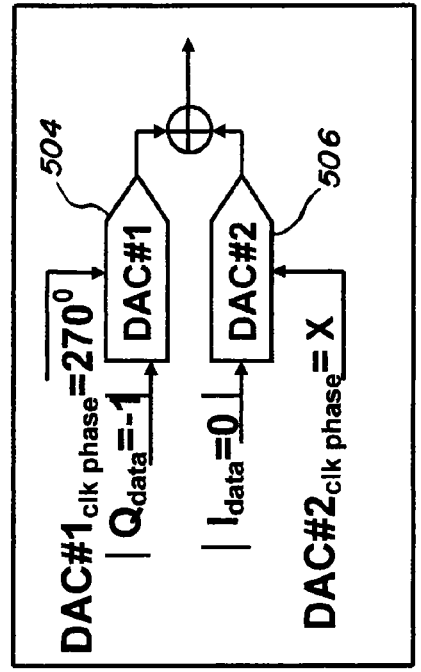
FIG. 28 is a diagram of digital-to-analog converters in operation according to an embodiment of the present invention.

The present invention is beneficially applicable even when only one channel is active. The multiplexer can be used to ensure signals are transmitted to both the DAC 504 (DAC#1) and the DAC 506 (DAC#2) on a more balanced basis, even when only a single channel is active. For example, as seen in FIGS. 23 and 24, for the IQ values (1,0) and (−1,0) which encompass the (a) portion and (b) portion of the I-axis, the DAC 504 (DAC#1) is OFF, while the DAC 506 (DAC#2) is active. However, for the IQ values (0,1) and (0,−1) which encompass the (c) portion and (d) portion of the Q-axis, the DAC 504 (DAC#1) is active, while the DAC 506 (DAC#2) is OFF. This is also shown, for example, in FIGS. 25-28.

Figures 29, 30:
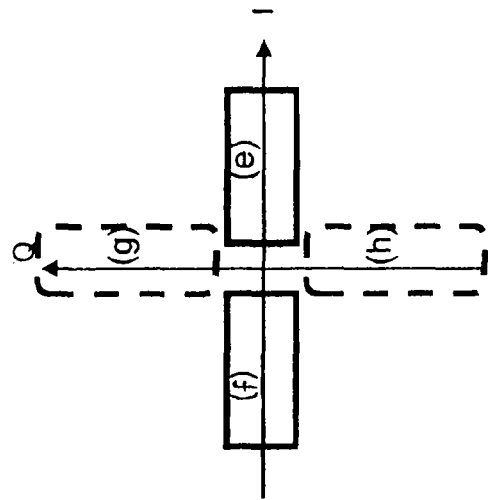
FIG. 29 is a table of IQ signal values and corresponding phases of signal input for digital-to-analog converters.
FIG. 30 depicts axis of a graph for IQ signal values according to an embodiment of the present invention.
Figure 31:
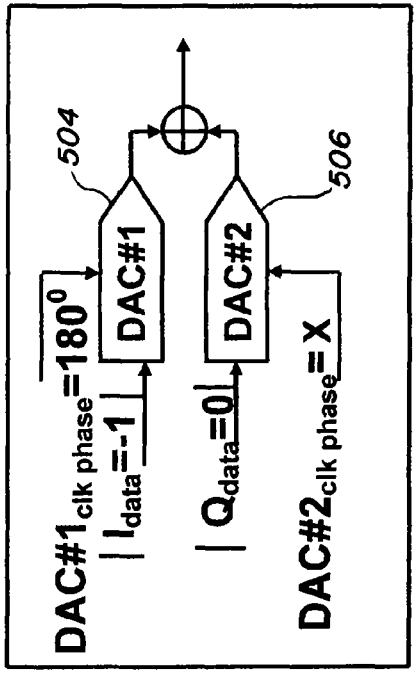
FIG. 31 is a diagram of digital-to-analog converters in operation according to an embodiment of the present invention.
Figure 32:
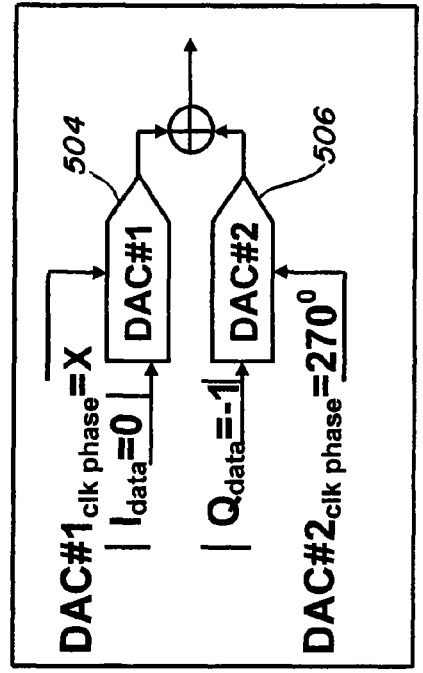
FIG. 32 is a diagram of digital-to-analog converters in operation according to an embodiment of the present invention.
Figure 33:
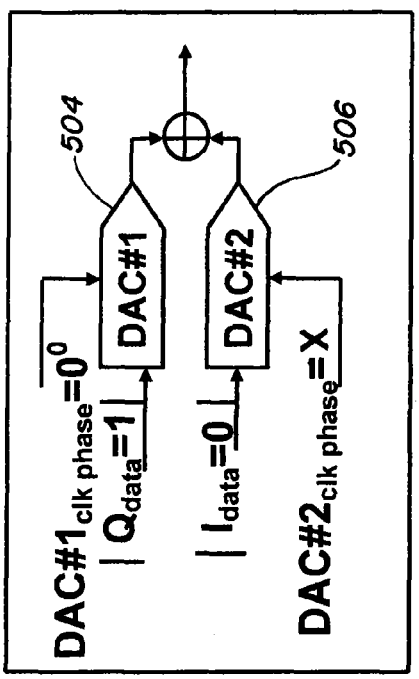
FIG. 33 is a diagram of digital-to-analog converters in operation according to an embodiment of the present invention.
Figure 34:
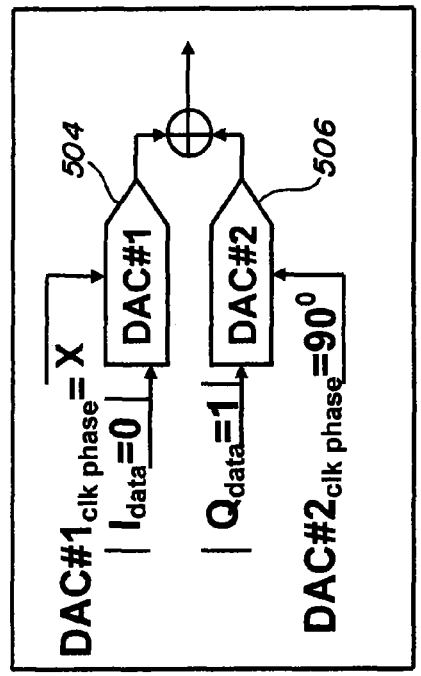
FIG. 34 is a diagram of digital-to-analog converters in operation according to an embodiment of the present invention.

Furthermore, the table of values regarding whether DAC 504 (DAC#1) or DAC 506 (DAC#2) is active or OFF can also be varied. For example, as seen in FIGS. 29 and 30, the DAC 504 (DAC#1) is now active for the IQ values (1,0) and (−1,0) while the DAC 506 (DAC#2) is OFF for the IQ values (1,0) and (−1,0). Furthermore, the DAC 504 (DAC#1) is now OFF for the IQ values (0,1) and (0,−1) while the DAC 506 (DAC#2) is now active for the IQ values (0,1) and (0,−1). This is also shown, for example, in FIGS. 31-34.

Although only two variations are shown in FIGS. 23 and 29, the DAC 504 and the DAC 506 can be active or OFF in other combinations, too. The alternation of the active/OFF status of the DAC 504 and the DAC 506 allows for a balancing or averaging of any noise or delays which may occur by having a single DAC active/OFF. Furthermore, in some embodiments, portions or all of the multiplexer 528 and/or the DAC unit 530 can be combined or integrated together.

Thus, the transmitter 500 can resolve the efficiency-isolation compromise on power combining with integrated reactive passive network, and digital signal commutation. Furthermore multiplexing can be done in the digital domain prior to the DAC, leading to relaxed analog complexity. Furthermore, the transmitter 500 can leverage standard digital IQ base band signal interface, and control paths through power amplification. The transmitter 500 can also attain higher efficiency by compressed drive of voltage mode class D digital PA to effectively amplify non constant envelop modulation. Also, the transmitter 500 can resolve efficiency and linearity comprise in high Peak-to-Average Power Ratio (PAPR) regimes through its amplification method. In addition, signal amplification and combination used in the transmitter 500 facilities fault tolerant system of amplifiers.

Figure 35:
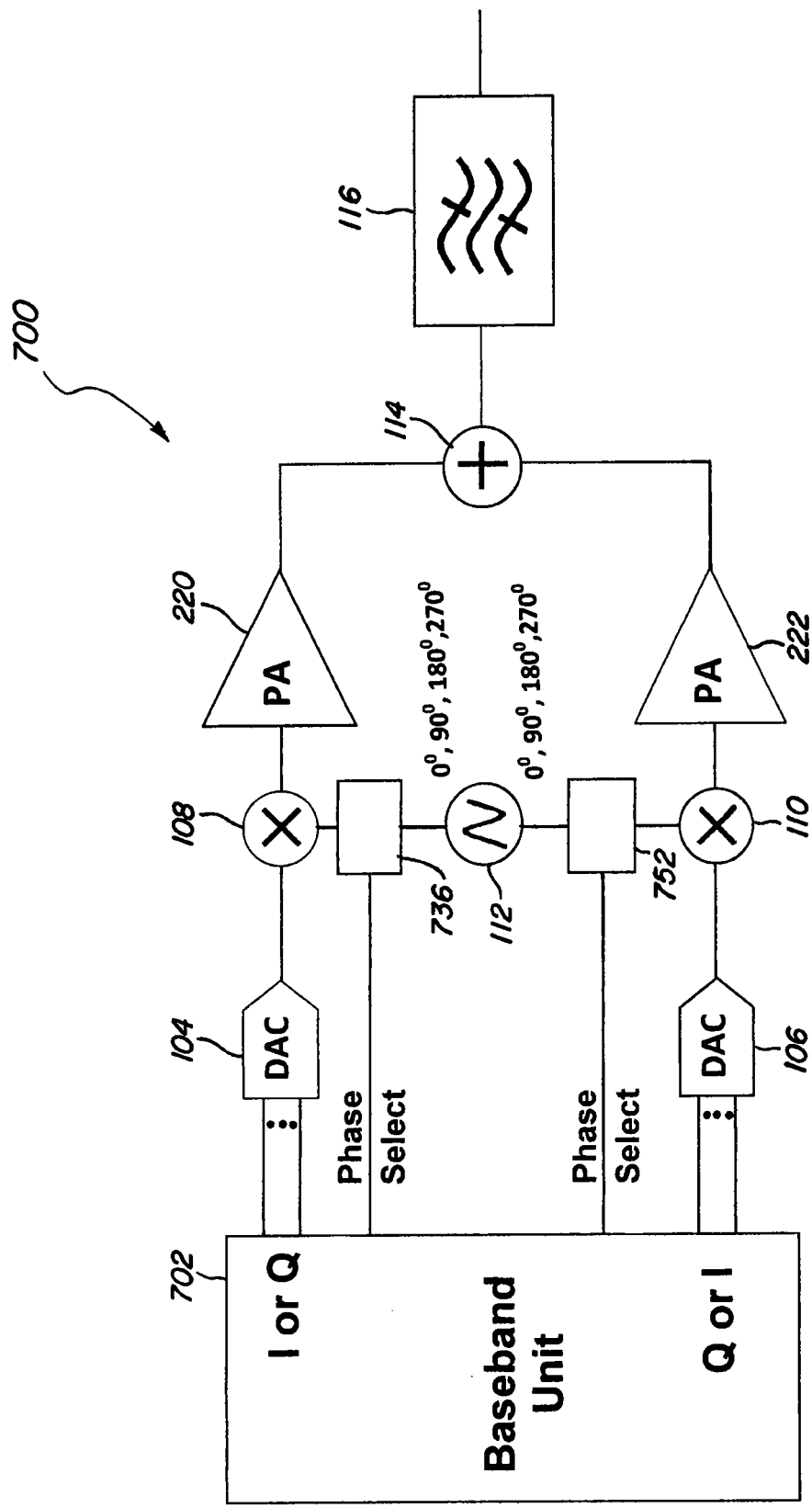
FIG. 35 depicts a transmitter according to an embodiment of the present invention.
Figure 36:
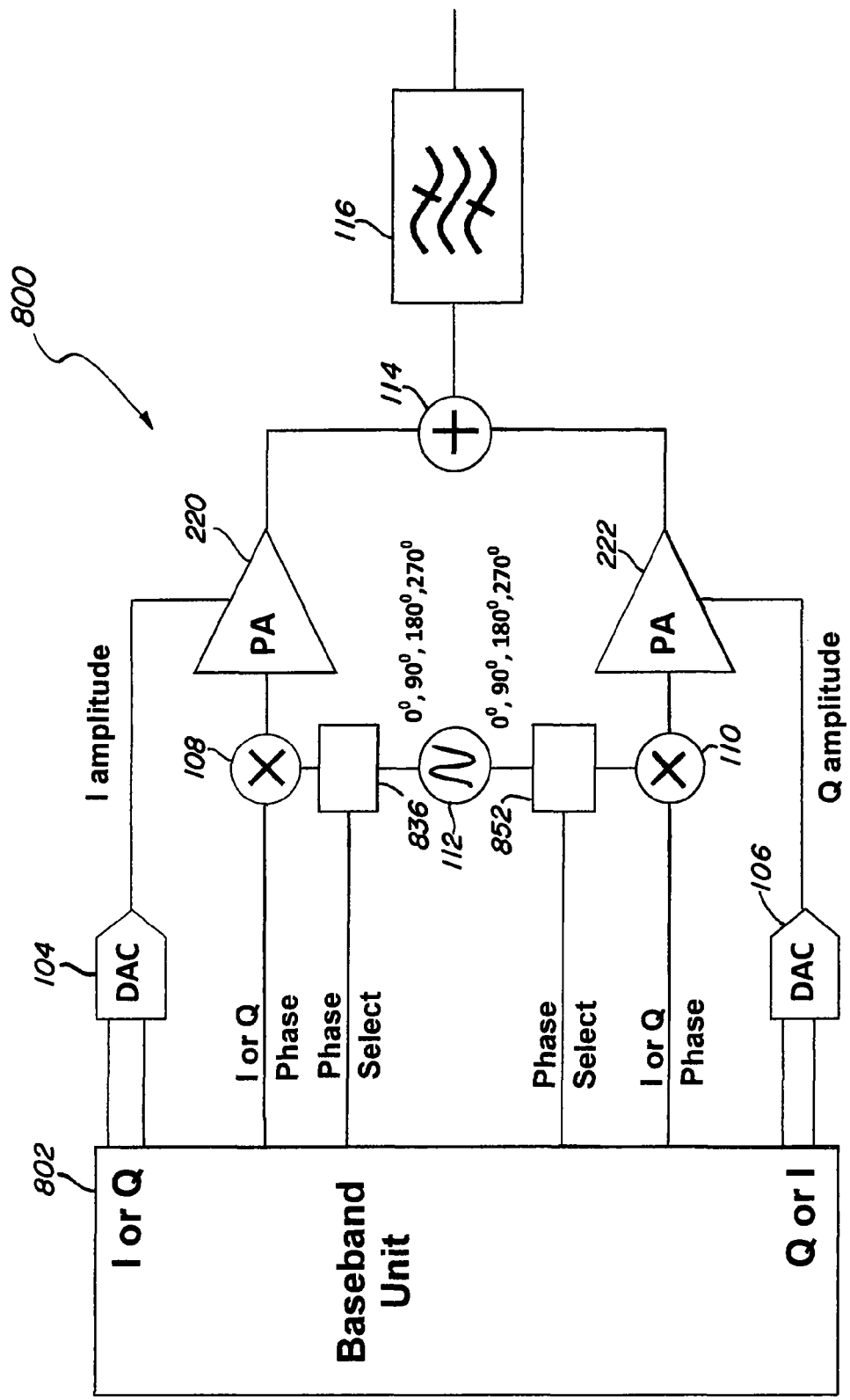
FIG. 36 depicts a transmitter according to an embodiment of the present invention.

The present invention is also beneficial with a transmitter that uses a Chireix combiner 114 as seen in FIGS. 35 and 36. In FIG. 36, the transmitter 700. The transmitter 700 can be, for example, a direct conversion Cartesian linear transmitter using split Linear IQ, combiner, and signal multiplexer. The transmitter is similar to the conventional transmitter 300, except that the transmitter 700 includes a baseband 702 instead of the baseband 102. The transmitter 700 also further includes the phase selection units 736 and 752.

The baseband 702 is configured to perform multiplexing and transmit the in-phase signal or a quadrature phase signal along a path to the power amplifier 220 or a path to the power amplifier 222 based on desired phase differences. That is, the baseband 702 can transmit components of the in-phase signal along a path to the power amplifier 220 and components of the quadrature-phase signal along a path to the power amplifier 222, or the baseband 702 can transmit components of the quadrature-phase signal along a path to the power amplifier 220 and components of the in-phase signal along a path to the power amplifier 222 depending on the desired phase differences. Similarly, the phase selectors 736 and 752 can transmit signals with the corresponding phases of the in-phase signal or quadrature phase signal based on the desired phase differences.

The transmitter 800 is similar to the transmitter 700 as shown in FIG. 36. The baseband 802, the phase selectors 836, and the phase selectors 852 perform similar to the baseband 802, the phase selectors 836, and the phase selectors 852. However, the baseband 802, the phase selectors 836, and/or the phase selectors 852 are configured for split AM IQ and PM IQ. Thus, the transmitter 800 can be, for example, a direct conversion Cartesian transmitter, such as a polar transmitter.

Figure 37:
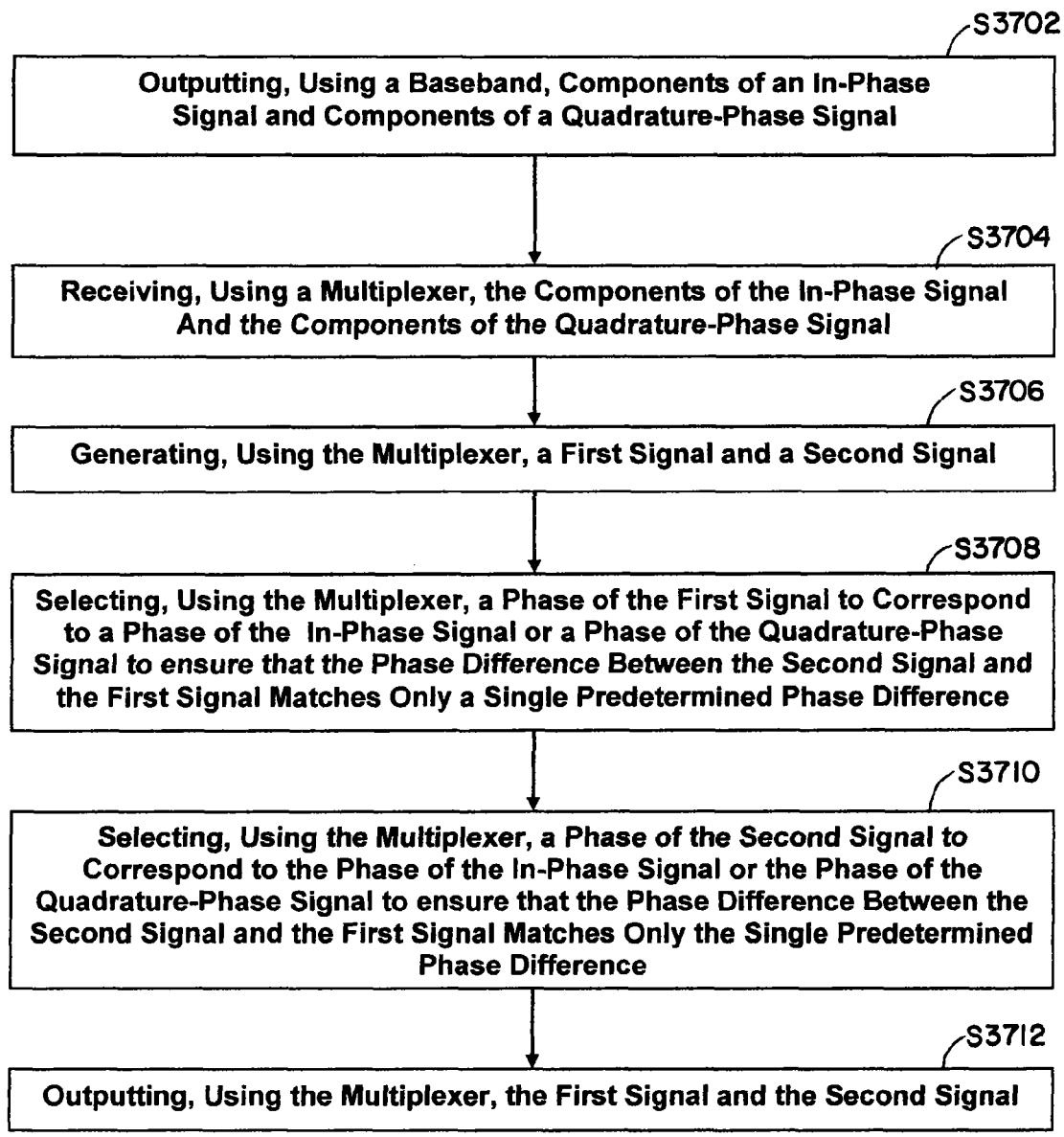
FIG. 37 depicts a process according to an embodiment of the present invention.

In one embodiment, the present invention can be a process as shown in FIG. 37. In Step S3702, components of an in-phase signal and components of a quadrature-phase signal are output using a baseband. For example, the baseband 502 (FIG. 5) can output components of an in-phase signal and components of a quadrature-phase signal.

In Step S3704, components of the in-phase signal and components of the quadrature-phase signal are received using a multiplexer. For example, the multiplexer 528 can receive the components of the in-phase signal and components of the quadrature-phase signal. In Step S3706, a first signal and a second signal are generated using a multiplexer. For example, in one embodiment, a first signal and a second signal are generated using the multiplexer 528.

In Step S3708, a phase of the first signal is selected using a multiplexer to correspond to a phase of the in-phase signal or a phase of the quadrature-phase signal to ensure that the phase difference between the second signal and the first signal matches only the single predetermined phase difference. For example, a phase of the first signal is selected using the multiplexer 528 to correspond to a phase of the in-phase signal or a phase of the quadrature-phase signal to ensure that the phase difference between the second signal and the first signal matches only the single predetermined phase difference. The predetermined phase difference can be, for example, a positive 90°.

In Step S3710, a phase of the second signal is selected to using a multiplexer to correspond to a phase of the in-phase signal or a phase of the quadrature-phase signal to ensure that the phase difference between the second signal and the first signal matches only the single predetermined phase difference. For example, a phase of the second signal is selected using the multiplexer 528 to correspond to a phase of the in-phase signal or a phase of the quadrature-phase signal to ensure that the phase difference between the second signal and the first signal matches only the single predetermined phase difference. The predetermined phase difference can be, for example, a positive 90°.

In Step S3712, the first signal and the second signal are outputted, using the multiplexer. For example, the multiplexer 528 can output the first signal and the second signal to the DAC unit 530. The DAC unit 530 can then convert the first signal and the second signal into the first analog signal and the second analog signal.

Those of ordinary skill in the art would appreciate that the various illustrative logical blocks, modules, and algorithm steps described in connection with the examples disclosed herein may be implemented as electronic hardware, or combinations of both electronic hardware and computer software. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with software, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless modem. In the alternative, the processor and the storage medium may reside as discrete components in a wireless modem.

The previous description of the disclosed examples is provided to enable any person of ordinary skill in the art to make or use the disclosed methods, system and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A transmitter comprising:
   a baseband outputting components of an in-phase signal and components of a quadrature phase signal;
   a multiplexer receiving the components of the in-phase signal and the components of the quadrature-phase signal, and outputting a first signal, and a second signal;
   a first digital-to-analog converter receiving the first signal and converting the first signal into a first analog signal;
   a second digital-to-analog converter receiving the second signal and converting the second signal into a second analog signal; and
   a Chireix combiner, wherein the Chireix combiner includes a capacitor portion and an inductor portion, wherein the capacitor portion receives the first analog signal, and the inductor portion receives the second analog signal,
   wherein the multiplexer is configured to select a phase of the first signal to correspond to a phase of the in-phase signal or a phase of the quadrature-phase signal, and select a phase of the second signal to correspond to the phase of the in-phase signal or the phase of the quadrature-phase signal, to ensure that a phase difference between the second signal and the first signal matches only a single predeterminded phase difference of positive 90° or negative 90°, such that the Chireix combiner is optimized for efficiency.

2. The transmitter of claim 1 wherein the multiplexer selects the phase of the first signal and the phase of the second signal based on a sign bit of the in-phase signal and a sign bit of the quadrature-phase signal.

3. The transmitter of claim 2 wherein the multiplexer is further configured to select the phase of the first signal and the phase of the second signal by switching the phase of the first signal with the phase of the second signal in order to match a polarity of the phase difference between the second signal and the first signal with a polarity of the single predetermined phase difference.

4. The transmitter of claim 3 wherein the multiplexer is further configured to switch the phase difference between the second signal and the first signal, from negative 90° to positive 90°, thereby optimizing efficiency of the Chireix combiner.

5. The transmitter of claim 1 wherein the multiplexer includes a first phase selector outputting the first signal and a second phase selector outputting the second signal.

6. The transmitter of claim 5 further comprising a first synchronization unit receiving the first signal and a second synchronization unit receiving the second signal, the first synchronization unit and the second synchronization unit synchronizing the first signal and the second signal.

7. The transmitter of claim 6 wherein the multiplexer includes a delay selection unit outputting delayed signals to ensure a proper alignment of the first signal and the second signal.

8. The transmitter of claim 5 further comprising an oscillator transmitting phase signals to the first phase selector and the second phase selector.

9. The transmitter of claim 1 wherein the first digital-to-analog converter and the second digital-to-analog converter are each a split capacitor band-pass digital-to-analog converter.

10. The transmitter of claim 1 wherein the multiplexer is configured to select the phase of the first signal and the phase of the second signal in digital domain prior to the conversion of the first signal and the second signal to the first and the second analog signals, respectively.

11. The transmitter of claim 1 wherein the multiplexer is configured to select a polarity of the phase difference between the second signal and the first signal to match a polarity of the single predetermined phase difference.

12. The transmitter of claim 1 wherein the first digital-to-analog converter and the second digital-to-analog converter each has an active state and an off state, and
   wherein the multiplexer is further configured to alternate between the active state and the off state of the first digital-to-analog converter first and alternate between the active state and the off state of the second digital-to-analog converter, based on the components of the in-phase signal and the components of the quadrature-phase signal, thereby balancing or averaging noise or delays.

13. A method for outputting signals in a transmitter comprising:

outputting, using a baseband, components of an in-phase signal and components of a quadrature-phase signal;

receiving, using a multiplexer, the components of the in-phase signal and the components of the quadrature-phase signal;

generating, using the multiplexer, a first signal and a second signal;

selecting, using the multiplexer, a phase of the first signal to correspond to a phase of the in-phase signal or a phase of the quadrature-phase signal;

selecting, using the multiplexer, a phase of the second signal to correspond to the phase of the in-phase signal or the phase of the quadrature-phase signal;

outputting, using the multiplexer, the first signal and the second signal; and generating, using a first digital-to-analog converter, a first analog signal from the first signal from the multiplexer;

generating, using a second digital-to-analog signal from the second signal from the multiplexer;

receiving, using a capacitor portion of a Chireix combiner, the first analog signal; and receiving, using an inductor portion of the Chireix combiner, the second analog signal, wherein the phase of the first signal and the phase of the second signal are each selected to ensure that a phase difference between the second signal and the first signal matches only a single predetermined phase difference of positive 90° or negative 90°, such that the Chireix combiner is optimized for efficiency.

14. The method of claim 13 wherein the predetermined phase difference is positive 90°.

15. The method of claim 13 wherein the first digital-to-analog converter and the second digital-to-analog converter are each a split capacitor band-pass digital-to-analog converter.

16. The method of claim 13 further comprising
selecting, using the multiplexer, the phase of the first signal and the phase of the second signal based on a sign bit of the in-phase signal and a sign bit of the quadrature-phase signal.

17. The method of claim 13 further comprising
outputting, using a first phase selector in the multiplexer, the first signal; and
outputting, using a second phase selector in the multiplexer, the second signal.

18. The method of claim 17 further comprising
synchronizing, using a first synchronization unit and a second synchronization unit, the first signal and the second signal.

19. The method of claim 17 further comprising
transmitting, using an oscillator, phase signals to the first phase selector and the second, phase selector.

* * * * *